Oct. 19, 1948.  L. LANDAU  2,451,961
PRODUCTION OF HOLLOW ARTICLES BY DIPPING
Filed July 7, 1947
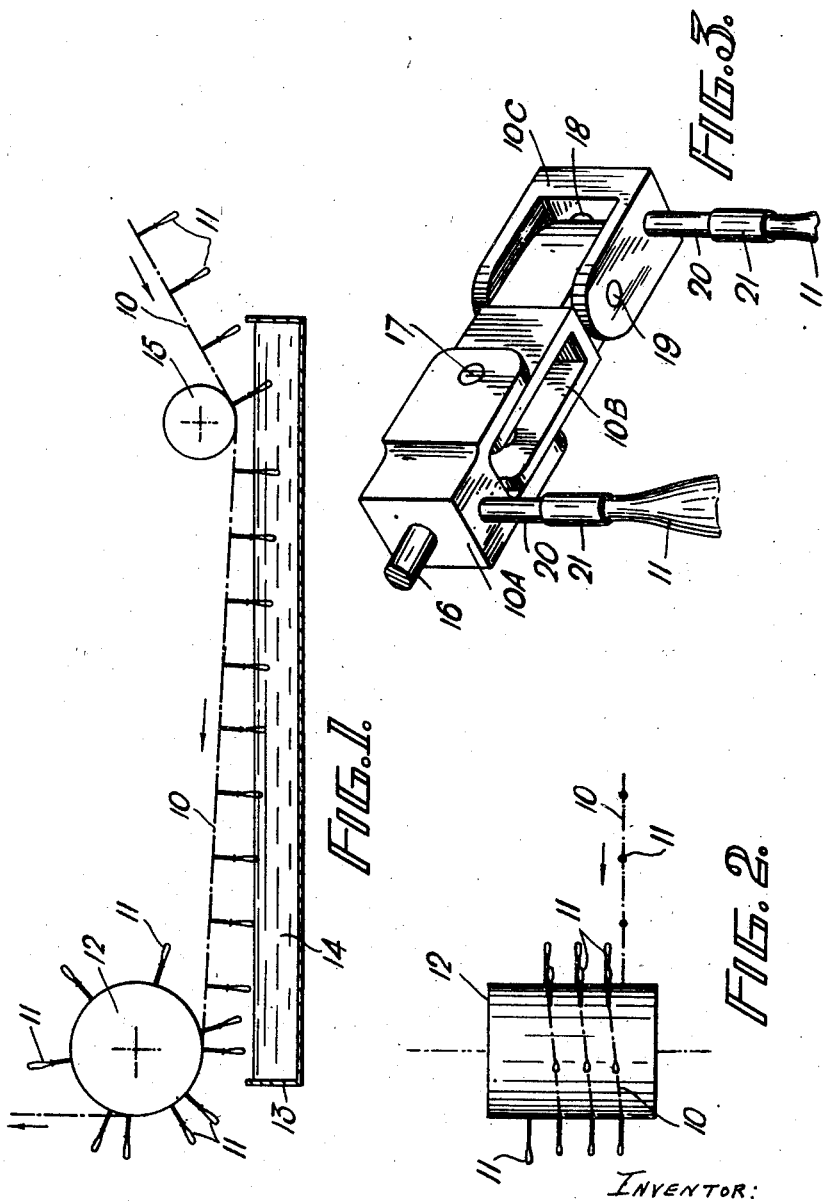
INVENTOR:
LUCIAN LANDAU
By Stevens, Davis & Miller
his attorneys Patented Oct. 19, 1948

2,451,961

UNITED STATES PATENT OFFICE 2,451,961

PRODUCTION OF HOLLOW ARTICLES BY DIPPING

Lucian Landau, Chingford, London, England, assignor to Latex Industries Limited, Chingford, London, England Application July 7, 1947, Serial No. 759,385
In Great Britain July 11, 1946

7 Claims. (Cl. 18—24)

This invention relates to a method and apparatus for automatically producing hollow articles by dipping from aqueous dispersions of rubber or other film forming liquids or solutions of these materials in organic solvents.

An object of the invention is to provide an improved method and apparatus enabling the finished articles to be produced without any appreciable amount of manual labour and having a more uniform thickness owing to the different method of distributing the fluid over the formers. It is an object of the invention to produce an apparatus which is simpler to install and occupying less space than known machines, the apparatus being of the type in which a continually or intermittently driven endless flexible member carrying the formers travels over a bath which enables the formers to be immersed in the film forming liquid and then submitted to the usual finishing operations such as drying, beading and vulcanising. The endless flexible member may conveniently be constructed of canvas and rubber or a single or laminated steel band. A biplanar chain with links connected by swivel connections has been found the most satisfactory. Such a conveyor, regardless of how constructed, will be referred to hereinafter as the "conveyor band."

According to the invention a method for the production of hollow articles by dipping formers into rubber latex or other film forming liquid comprises attaching the formers to the underside of a conveyor band projecting downwardly and moving the said band in a downward steeply inclined direction over the bath of a film forming liquid until each former in turn is completely immersed and from the lowest point requisite for complete immersion of the formers moving the band in an upward gradually inclined direction to a point where the formers emerge from the liquid and then moving the conveyor band in a spiral course on a more or less horizontal axis and finally through a heating zone, i. e. a zone in which the film is heated, which may be advantageously placed in a position in which the conveyor band may travel in an upward direction.

Conveniently, according to the invention, the formers may be disposed on the underside of the conveyor band in a single or double row and the spiral course of the conveyor band may be a spiral of three to five turns.

During the first part of the passage of the conveyor band through the heating zone the formers are rotated through an angle of at least 90°.

Various methods of applying heat to the film may be employed, such as by radiant heat emitters or dielectric heating.

After passing through the heating zone the conveyor band carrying the formers with the films formed thereon is preferably moved successively through a cooling zone and then through the same or a different bath of film forming liquid in the same manner as that above described.

The invention includes apparatus for the production of hollow articles by dipping formers into a film forming liquid which comprises an endless conveyor band carrying on one side thereof a number of formers rotatably mounted at right angles to the surface of the said conveyor band, means for moving the conveyor steeply towards the surface of a film forming liquid contained in a tank below the said conveyor, and means for moving it upwardly in a gradually inclined direction and then spirally and finally in an upward direction.

The means for giving a spiral direction to the conveyor band may conveniently take the form of a cylindrical member mounted on a horizontal spindle.

The apparatus also includes means for heating the film on the formers during the upward passage of the conveyor band.

Apparatus according to the present invention is advantageously employed in connection with the process described and claimed in patent specification No. 576,812.

One way in which the invention may be carried into effect will now be described with the aid of the accompanying drawing. In the drawing—

Figure 1 is a side elevation in diagrammatic form representing a portion of the apparatus in which a section of a chain conveyor is shown carrying formers into and out of a tank carrying the film forming liquid;

Figure 2 is a plan view in diagrammatic form of the drum showing the spiral movement of the chain conveyor carrying the formers round the drum;

Figure 3 is a detail in perspective of a complete chain link showing the attachment of the formers to the chain.

Referring to Figure 1, a section of an endless biplanar chain is represented for simplicity's sake by a single line 10. The chain 10 is directed by pulleys (not shown) in a steeply inclined direction towards the pulley 15 under which it passes to the horizontal drum 12, the pulley 15 being so positioned that the formers 11 attached to the underside of the chain 10 when the chain passes thereunder become completely immersed in the liquid 14 contained in the tank 13 extending under the chain between the pulley 15 and the drum 12. The drum 12 is so positioned that when the chain passes from pulley 15 thereto the formers rise out of the liquid and are clear thereof before the chain passes round the drum. The path between the pulley 15 and the drum 12 is prolonged sufficiently to enable the formers to emerge from the liquid so gradually that surplus fluid will drain off about as fast as the former rises out of the liquid. As shown in Figure 2 the chain makes three helical turns round the drum before rising vertically upwards through the drying device, which is not shown.

Details of the biplanar chain are shown in Figure 3 according to which each link of the chain 10 consists of three parts 10a, 10b and 10c pivotally connected together by the swivel pin 16 and the hinge pins 17 and 19, the whole link being connected to adjacent links by the swivel pin 16 and the bearing 18 for the swivel pin of the next link.

In carrying out the method by means of an apparatus as above described the conveyor descending steeply towards the surface of the film forming liquid 14 contained in the tank 13 immerses the formers successively to the required depth. The conveyor then, for example by means of the idler pulley 15, may be caused to run up a gentle incline thereby effecting a gradual withdrawal of the formers from the liquid 14, the surface of which is maintained at a constant level. The speed of withdrawal may be accurately determined by the angle of the incline and the speed of the conveyor. At the point at which the coated formers are free of the liquid the chain 10 moves spirally round the drum giving the formers a movement which maintains a uniform thickness of coating, and in this way an even distribution of the material over the formers is effected. After three to five turns the conveyor travels vertically upwards exposing the wet formers to radiant heat produced by suitably placed emitters. During the first part of this step the formers are preferably caused to rotate through at least 90° to ensure even drying. After the drying is complete the conveyor may travel over another pulley and along a short track to allow the formers to cool. A second dipping operation then follows exactly as previously described. For this purpose the conveyor may be directed in the manner already described, either through the same tank or through a different tank, in the former case it is desirable that the conveyor should travel in the opposite direction to that in which it travelled during the first dipping operation. After the second drying operation, the beading operation and other finishing processes such as vulcanising in the case of rubber may be carried out in known manner. Where vulcanisation is required it may be carried out in water, hot air or steam or by infra-red heating. For this purpose the conveyor may be forced to travel forward or backward or in the case of hot air treatment spirally through a tubular chamber in order to make the best use of the space available. Stripping operation follows in the conventional manner after which the formers return to the first dipping tank completing the cycle. The drying, cooling, beading and other finishing processes being carried out in known manner are not shown in the drawing.

What I claim is:

1. A method for the production of hollow articles by dipping formers into a film forming liquid which comprises attaching the formers to the under side of an endless conveyor band projecting downwardly and moving the said band in a downward steeply inclined direction over a bath of film forming liquid until each former in turn is completely immersed and from the lowest point requisite for complete immersion of the formers moving the band in an upward gradually inclined direction to a point where the formers emerge from the liquid and then moving the conveyor band in a spiral course on a substantially horizontal axis at right angles to the direction of travel and finally through a heating zone.

2. A method as claimed in claim 1, wherein the conveyor band carrying the formers, after passing through the heating zone, is moved successively through a cooling zone and then again through a bath of film forming liquid.

3. Apparatus for the production of hollow articles by which formers are dipped into a film-forming liquid, which comprises an endless conveyor band carrying on one side thereof a number of formers rotatably mounted at right angles to the surface of the said conveyor band, means for moving the conveyor steeply towards the surface of the film forming liquid contained in a tank below the said conveyor and means for moving it upwardly in a gradually inclined direction and then spirally and finally in an upward direction.

4. A method for the production of hollow articles by dipping formers into rubber latex which comprises attaching the formers to the under side of an endless conveyor band projecting downwardly and moving the said conveyor band in a downward steeply inclined direction over a bath of film-forming liquid and until each former in turn is completely immersed and from the lowest point requisite for complete immersion of the formers moving the band in an upwardly gradually inclined direction to a point where the formers emerge from the liquid, and then moving the conveyor band in a spiral course on a substantially horizontal axis at right-angles to the direction of travel and finally through a heating zone.

5. A method as claimed in claim 1, wherein the spiral course of the conveyor band is a spiral of three to five turns.

6. Apparatus for the production of hollow articles by which formers are dipped into a film-forming liquid, which apparatus comprises a tank for the film-forming liquid and arranged above the tank, an endless conveyor in the form of a biplanar chain with links pivotally attached to give a swivel movement, the said links carrying on the under side thereof formers extending downwards perpendicular to the under side of the biplanar chain, pulley means being provided for directing the conveyor steeply downwards towards the tank to a predetermined point so that the formers on the under side of the chain become completely immersed and then upwards in a gradual incline and spirally around a drum mounted horizontally at the other end of the tank in a predetermined position to allow the formers to become clear of the liquid in the tank before passing with the chain around the drum, and finally vertically upwards from the drum and back to the starting point.

7. Apparatus as claimed in claim 6, wherein a heating zone is placed in a position in which the conveyor may travel in an upward direction from the drum.

LUCIAN LANDAU.

REFERENCES CITED

The following references are of record in the file of this patent:

UNITED STATES PATENTS

| Number | Name | Date |
|---|---|---|
| 2,139,545 | Gammeter | Dec. 6, 1938 |
| 2,128,827 | Killian | Aug. 30, 1938 |
| 1,991,118 | Raiche | Feb. 12, 1935 |
| 1,514,196 | Burian | Nov. 4, 1924 |